United States Patent Office 2,715,081
Patented Aug. 9, 1955

2,715,081

ELECTRIC STORAGE BATTERY

Carl Gritman and Charles A. Toce, Sunland, and Robert Broussard, Glendale, Calif., assignors to Electro-Acid Corporation, Sunland, Calif., a corporation of Texas No Drawing. Application July 29, 1952, Serial No. 301,422

9 Claims. (Cl. 136—154)

This invention relates to storage batteries of the well known lead-sulphuric acid type and to an improved electrolyte which is less destructive of the plates of the battery and which has the capacity to permit the battery to be charged or discharged at rates which otherwise would either destroy the plates or at least seriously impair or shorten the useful life thereof in the presence of the common dilute sulphuric acid electrolyte.

The common storage battery of the type here considered, employs plates of lead and lead dioxide and an electrolyte of dilute sulphuric acid of a density of about 1.275 and incident to discharge, some of the sulphur is deposited on the plates slowing up the current producing function and also slowing up the charging of the battery by obstruction of the movement of the electrolyte into and out of combination with the plates. The slowness of this action retards charging the battery at a rate in excess of about 6 amperes per cell or any prolonged discharge thereof in excess of that rate without danger of serious damage to the plates by loss of material or by buckling thereof. Attempts have been made heretofore to provide electrolytes which tend to prevent this so-called "sulphation" of the plates and/or which would permit increased charge and discharge rates without damage to the battery, but so far as is known, none of such proposals have shown any proved continued public acceptance.

With the foregoing considerations in mind, it is an object of the present invention to provide an improved storage battery having the common lead-lead oxide type of plates together with an improved electrolyte having a capacity for a more rapid ion exchange into and out of the battery plates without deleterious effects on the physical structure of the plates.

Another object of the invention is to provide an electrolyte for the foregoing type of storage battery which does not produce the undesirable effect of "sulphation" on the battery plates incident to discharge of the battery.

A further object of the invention is to provide an electrolyte for the foregoing type of storage battery which will not adversely affect the battery plates through long standing in a charged or uncharged state.

With the foregoing objects in view, together with such additional objects and advantages as may subsequently appear, the invention resides in the provision of an improved storage battery and an electrolyte therefore described, by way of example in the following specification of a representative mode of execution of the invention.

The battery may be of any of the usual physical structures for the lead-lead oxide types of batteries including the battery case of acid resistant material and at least one plate of lead dioxide forming the positive pole thereof and at least one plate of pure sponge lead forming the negative pole thereof. The electrolyte is formed according to the following formula:

Sulphuric acid $H_2SO_4$, 1/3 by volume
Distilled water $H_2O$, 2/3 by volume and to each 100 gallons of the above solution there is added the following:

Selenium oxychloride $SeOCl_2$, 1 lb.

the proportion by weight being of the order of .1 percent. After placing the foregoing electrolyte in the battery case with the said sponge lead and lead oxide plates, the battery is subjected to charging in the usual manner which may be at a rate as high as 100 amperes.

While the exact chemical and electro-chemical reactions which take place incident to the charging and discharging of the battery are not conclusively known, the fact is that a battery employing the new electrolyte above described can be subjected to a charging rate of as much as 100 amperes for several hours without excessive heating and without damage to the plates; a treatment that would destroy any battery having only the common dilute sulphuric acid electrolyte. The discharge of the battery may be at equally high rates.

By way of test, a number of automobile batteries of different makes were purchased on the open market and were first fully charged at a rate that would not adversely affect the battery. These batteries together with a fully charged battery of the same size and embodying the present invention were subjected to breakdown tests which consisted short circuiting the poles of each battery by means offering low resistance for succesive periods of five seconds each. Of the purchased batteries, none survived more than 40 of such discharge intervals without being at least completely discharged. All of said purchased batteries heated excessively, in some cases, the battery case broke, in others the plates were badly warped, and in all cases the surface of the battery plates suffered inordinate losses of plate material. In contrast to the effects on these batteries the battery of the present invention experienced a slight rise in temperature and testing thereof was discontinued after 140 of such discharge intervals. On taking the battery apart for inspection after testing as above described, the plates were found to be in their original condition with no observable loss of material and no warping or other damage.

In the manufacture of the ordinary lead-acid storage battery, the plates are placed in the battery case with the dilute sulphuric acid electrolyte and the battery is charged at low rate. The electrolyte is then removed and fresh electrolyte of full strength is supplied and further charged at higher rate. If the battery is not thereafter subjected to charging and maintained in substantially fully charged condition, it is subject to rapid deterioration. Thus the battery manufacturer must maintain the battery supplied with electrolyte and keep the battery charged until it is sold. The shipment of the acid-containing batteries is not only costly due to the added weight, but also, the shipment is hazardous due to the possibility of breakage or spillage with consequent damage to other shipments.

In contrast, in the present battery, the plates may be placed in the electrolyte and charged at the previously specified high rate for, say, three and one-half hours, then discharged, and the plates thereafter removed from the electrolyte and dried. Thereafter, the plates may be merely placed in a case and distilled water added and the battery charged. The resultant product is a fully charged battery. For some reason as yet unknown, the hygroscopic character of the sulphuric acid is destroyed and the dry plates, while containing the components which with solution with water will produce the acid electrolyte at the proper strength, and while the plates are in said dry condition they may be freely handled with the bare hand. Thus not only it is possible to ship the battery in dry condition with reduced cost and increased safety, but the plates may likewise be shipped with still further savings in transportation costs and equally increased safety. Still further, the battery once formed and charged, will remain charged indefinitely without substantial loss of effectiveness. The proportion of selenium oxychloride to be added to the electrolyte may be varied somewhat, say, between .05 percent and .15 percent by weight, although the proportion of about .1 appears to be the optimum proportion.

Another important advantage of the present invention is the discovery that the voltage per cell is increased from the usual 2 volts to about 2.2 volts. This appears to be a result of the fact that in the present invention there is no deposit of lead sulphate on the surfaces of the plates with the attendant decrease in resistance to electron flow and the consequent increase in voltage noted. Whether this increased voltage is in fact due to a decreased resistance as above suggested or is due to an increased total electron release derived in some manner from the addition of the selenium compound which has not been determined, but the facts are that the above-described combination of elements produces the recited results in output, in ability to safely withstand abnormal charging and discharge rates, in ability to maintain charged condition without need for constant charging input, and in the recited decrease in shipping costs and safety to other goods coming in contact therewith incident to shipment.

It will also be apparent that while the addition of the selenium component to the electrolyte is the most practicable mode of so doing, it may also be added in other manners such as a coating applied to the interior surface of the case or to the surfaces of the plates or that it can be incorporated in the plate material and more particularly in the lead dioxide plate. While it has not been proved, it is suspected that the well known capacity for selenium dioxide to allow current to pass therethrough in one direction and to resist current flow in the opposite direction may have some part in the novel, advantageous and valuable results achieved by the present invention. It does appear that the formation of selenium oxide from the added selenium oxychloride may be a possibility under the influence of electron flow either through the charging of the battery or possibly as an incident to discharge thereof.

While in the foregoing specification we have described certain modes of execution of the invention, we do not thereby imply that the invention is to be deemed to be limited to the exact forms thereof thus disclosed and it is to be understood that the invention embraces all such modifications as may come within the purview of the appended claims.

We claim:

1. In a storage battery of the lead-sulphuric type, the improvement which consists in adding to the electrolyte of dilute sulphuric acid an amount of selenium oxychloride in an amount substantially equal to .1 percent of said electrolyte by weight.

2. In a storage battery of the lead-sulphuric acid type, the improvement which consists in the addition of selenium and chlorine to the active components of said battery.

3. In a storage battery of the lead-sulphuric acid type, the improvement which consists in the addition of selenium and chlorine to the dilute sulphuric acid electrolyte of said battery.

4. In a storage battery of the lead-sulphuric acid type, the improvement which consists in the addition to the dilute sulphuric acid electrolyte thereof of a compound containing selenium, oxygen and chlorine in a proportion not less than .05 percent by weight.

5. In a storage battery of the lead-sulphuric acid type, the improvement which consists in the addition to the dilute sulphuric acid electrolyte thereof of selenium oxychloride in the proportion of about .05 percent to about .15 percent by weight.

6. In a storage battery, a fluid containing case, a positive plate composed principally of lead dioxide, and a negative plate composed principally of sponge lead suspended in said case and disposed out of physical contact with each other, and an electrolyte filling said case and comprising a dilute solution of sulphuric acid having a specific gravity of about 1.275 and selenium oxychloride in an amount equal to about 0.1 percent by weight of said acid solution.

7. In an electrolyte for an electric storage battery, selenium oxychloride.

8. The method of manufacturing an electric storage battery comprising immersing sponge lead plates and lead dioxide plates in an electrolyte essentially containing aqueous sulphuric acid and a soluble selenium compound, charging the same, then discharging the same to give plates essentially comprising lead sulphate, removing the plates from the electrolyte and drying the same, and assembling the dried plates in a battery case.

9. The method of manufacturing electric storage plates comprising immersing lead and/or lead dioxide plates in an electrolyte essentially containing aqueous sulphuric acid and a soluble selenium compound, charging the plates, then discharging the plates, whereby plates essentially comprising lead sulphate with electro-deposited selenium compound are had.

References Cited in the file of this patent

UNITED STATES PATENTS 1,289,366     Benner et al.     Dec. 31, 1918

FOREIGN PATENTS 17,674     Great Britain     of 1905